United States Patent
Paladugu et al.

(10) Patent No.: US 11,824,622 B2
(45) Date of Patent: Nov. 21, 2023

(54) RELAY NODE IDENTIFIER UPDATE

(71) Applicant: QUALCOMM Incorporated, San Diego, CA (US)

(72) Inventors: Karthika Paladugu, San Diego, CA (US); Hong Cheng, Basking Ridge, NJ (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/823,498

(22) Filed: Aug. 30, 2022

(65) Prior Publication Data

US 2022/0416881 A1 Dec. 29, 2022

Related U.S. Application Data

(63) Continuation of application No. PCT/CN2022/076733, filed on Feb. 18, 2022.

(30) Foreign Application Priority Data

May 3, 2021 (WO) .................. PCTCN2021091801

(51) Int. Cl.
*H04B 7/14* (2006.01)
*H04B 7/185* (2006.01)
*H04W 76/11* (2018.01)

(52) U.S. Cl.
CPC ........... *H04B 7/18513* (2013.01); *H04B 7/14* (2013.01); *H04W 76/11* (2018.02)

(58) Field of Classification Search
CPC ........................... H04B 7/14–17; H04W 76/11
See application file for complete search history.

(56) References Cited

U.S. PATENT DOCUMENTS

| 10,530,461 | B2 | 1/2020 | Sadiq et al. |
| 11,184,748 | B2* | 11/2021 | Lee .......................... H04W 4/40 |
| 2016/0269185 | A1 | 9/2016 | Stojanovski et al. |
| 2016/0285539 | A1* | 9/2016 | Sadiq .................... H04W 76/14 |

(Continued)

FOREIGN PATENT DOCUMENTS

| CN | 107409429 A | 11/2017 |
| CN | 108307472 A | 7/2018 |

(Continued)

OTHER PUBLICATIONS

Alcatel-Lucent., et al., "On Prose VE-to-Network Relay discovery", SA WG2 Meeting #109 S2-151656, May 29, 2015(May 29, 2015), May 25-29, 2015, Fukuoka, Japan, pp. 1-6, The whole document.

(Continued)

*Primary Examiner* — Raymond S Dean
(74) *Attorney, Agent, or Firm* — Harrity & Harrity, LLP

(57) ABSTRACT

Various aspects of the present disclosure generally relate to wireless communication. In some aspects, a network entity may receive, from a relay node via a radio access link, information indicating a link layer identifier of the relay node associated with a relay service, wherein the relay node is associated with a radio access identifier. The network entity may configure a relay service with the relay node and a remote node using a mapping between the radio access identifier and the link layer identifier. Numerous other aspects are described.

30 Claims, 11 Drawing Sheets

(56) References Cited

U.S. PATENT DOCUMENTS

| | | | |
|---|---|---|---|
| 2017/0079059 A1* | 3/2017 | Li | H04W 16/02 |
| 2017/0317740 A1 | 11/2017 | Basu et al. | |
| 2019/0150221 A1* | 5/2019 | Tseng | H04W 76/27 |
| | | | 370/331 |
| 2019/0268732 A1* | 8/2019 | Lu | H04W 4/12 |
| 2022/0141698 A1* | 5/2022 | Zhang | H04W 28/0205 |
| | | | 370/329 |

FOREIGN PATENT DOCUMENTS

| | | |
|---|---|---|
| CN | 109587729 A | 4/2019 |
| CN | 111901847 A | 11/2020 |
| WO | 2016153807 | 9/2016 |
| WO | 2016160278 A1 | 10/2016 |
| WO | 2018058683 A1 | 4/2018 |

OTHER PUBLICATIONS

Huawei, et al., "Discussion on Multiple Relay UE IDs for a Relay UE", 3GPP TSG-RAN WG2 Meeting #93, R2-161072, Malta, Feb. 15-19, 2016 the whole document, 5 Pages.

International Search Report and Written Opinion—PCT/CN2021/091801—ISA/EPO—dated Jan. 27, 2022.

International Search Report and Written Opinion—PCT/CN2022/076733—ISA/EPO—dated May 13, 2022.

ZTE: "Discussion on Connection Establishment and Bearer Setup", 3GPP Draft, R2-168149, 3GPP TSG-RAN WG2 Meeting #96, Discussion on Connection Establishment and Bearer Setup, 3rd Generation Partnership Project (3GPP), Mobile Competence Centre, 650, Route Des Lucioles, F-06921 Sophia-Antipolis, vol. RAN WG2. No. Reno. USA, Nov. 14, 2016-Nov. 18, 2016, Nov. 13, 2016 (Nov. 13, 2016), XP051177836, 4 Pages, Retrieved from the Internet: URL: http://www.3gpp.org/ftp/Meetings_3GPP_SYNC/RAN2/Docs/ [retrieved on Nov. 13, 2016] the Whole Document.

3GPP: "3rd Generation Partnership Project, Technical Specification Group Services and System Aspects, Proximity based Services (ProSe) in the 5G System (5GS) (Release 17)", 3GPP TS 23.304, V0.2.0, Mobile Competence Centre, 650, Route Des Lucioles, F-06921 Sophia-Antipolis Cedex, France, Apr. 2021, pp. 1-79.

3GPP TS 23.303: "3rd Generation Partnership Project, Technical Specification Group Services and System Aspects, Proximity-Based Services (ProSe), Stage 2 (Release 16)", 3GPP, Mobile Competence Centre, 650, Route Des Lucioles, F-06921 Sophia-Antipolis Cedex, France, vol. SA WG2, No. V16.0.0, Jul. 9, 2020, 130 Pages, XP051924379, chapters 5.3.7, 4.6.4.3, 4.6.4.9, 4.6.4.10, 3.1, 4.3.1, 4.4.1.1, 4.6.4.1-4.6.4.2b, 4.6.4.11, 4.6.4.12, 5.3.2-5.3.6A.2.3, 5.5.4-5.5.9, B, Section 5.3.1.2, section 5.3.7 and section 5.3.7.1.

* cited by examiner

RELAY NODE IDENTIFIER UPDATE

CROSS-REFERENCE TO RELATED APPLICATION

This application is a continuation of PCT Application No. PCT/CN2022/076733, filed Feb. 18, 2022, entitled "RELAY NODE IDENTIFIER UPDATE", which claims priority to PCT Application No. PCT/CN2021/091801, filed on May 3, 2021, entitled "RELAY NODE IDENTIFIER UPDATE," and assigned to the assignee hereof. This application is also a continuation of PCT Application No. PCT/CN2021/091801, filed on May 3, 2021, entitled "RELAY NODE IDENTIFIER UPDATE," and assigned to the assignee hereof. The disclosures of the prior Applications are considered part of and are incorporated by reference into this Patent Application in their entirety.

FIELD OF THE DISCLOSURE

Aspects of the present disclosure generally relate to wireless communication and to techniques and apparatuses for a relay node identifier update.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a network entity includes receiving, from a relay node via a radio access link, information indicating a link layer identifier of the relay node associated with a relay service, wherein the relay node is associated with a radio access identifier; and configuring and supporting a relay service with the relay node and a remote node using a mapping between the radio access identifier and the link layer identifier.

In some aspects, a method of wireless communication performed by a relay node includes transmitting a discovery message for relaying communications with a remote node, wherein the discovery message includes a link layer identifier of the relay node; transmitting, to a network entity via a radio access link, information indicating the link layer identifier of the relay node; and establishing a relay service using the link layer identifier.

In some aspects, an apparatus of a network entity for wireless communication includes a memory, and one or more processors, coupled to the memory, configured to: receive, from a relay node via a radio access link, information indicating a link layer identifier of the relay node associated with a relay service, wherein the relay node is associated with a radio access identifier; and configure and support a relay service with the relay node and a remote node using a mapping between the radio access identifier and the link layer identifier.

In some aspects, an apparatus of a relay node for wireless communication includes a memory, and one or more processors, coupled to the memory, configured to: transmit a discovery message for relaying communications with a remote node, wherein the discovery message includes a link layer identifier of the relay node; transmit, to a network entity via a radio access link, information indicating the link layer identifier of the relay node; and establish a relay service using the link layer identifier.

In some aspects, a non-transitory computer-readable medium storing a set of instructions for wireless communication includes one or more instructions that, when executed by one or more processors of a network entity, cause the network entity to: receive, from a relay node via a radio access link, information indicating a link layer identifier of the relay node associated with a relay service, wherein the relay node is associated with a radio access identifier; and configure and support a relay service with the relay node and a remote node using a mapping between the radio access identifier and the link layer identifier.

In some aspects, a non-transitory computer-readable medium storing a set of instructions for wireless communication includes one or more instructions that, when executed by one or more processors of a relay node, cause the relay node to: transmit a discovery message for relaying communications with a remote node, wherein the discovery message includes a link layer identifier of the relay node; transmit, to a network entity via a radio access link, information indicating the link layer identifier of the relay node; and establish a relay service using the link layer identifier.

In some aspects, an apparatus for wireless communication includes means for receiving, from a relay node via a radio access link, information indicating a link layer identifier of the relay node associated with a relay service, wherein the relay node is associated with a radio access identifier; and means for configuring and supporting a relay service with the relay node and a remote node using a mapping between the radio access identifier and the link layer identifier.

In some aspects, an apparatus for wireless communication includes means for transmitting a discovery message for relaying communications with a remote node, wherein the discovery message includes a link layer identifier of the apparatus; means for transmitting, to a network entity via a radio access link, information indicating the link layer identifier of the apparatus; and means for establishing a relay service using the link layer identifier.

Aspects generally include a method, apparatus, system, computer program product, non-transitory computer-readable medium, user equipment, base station, network node, network entity, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
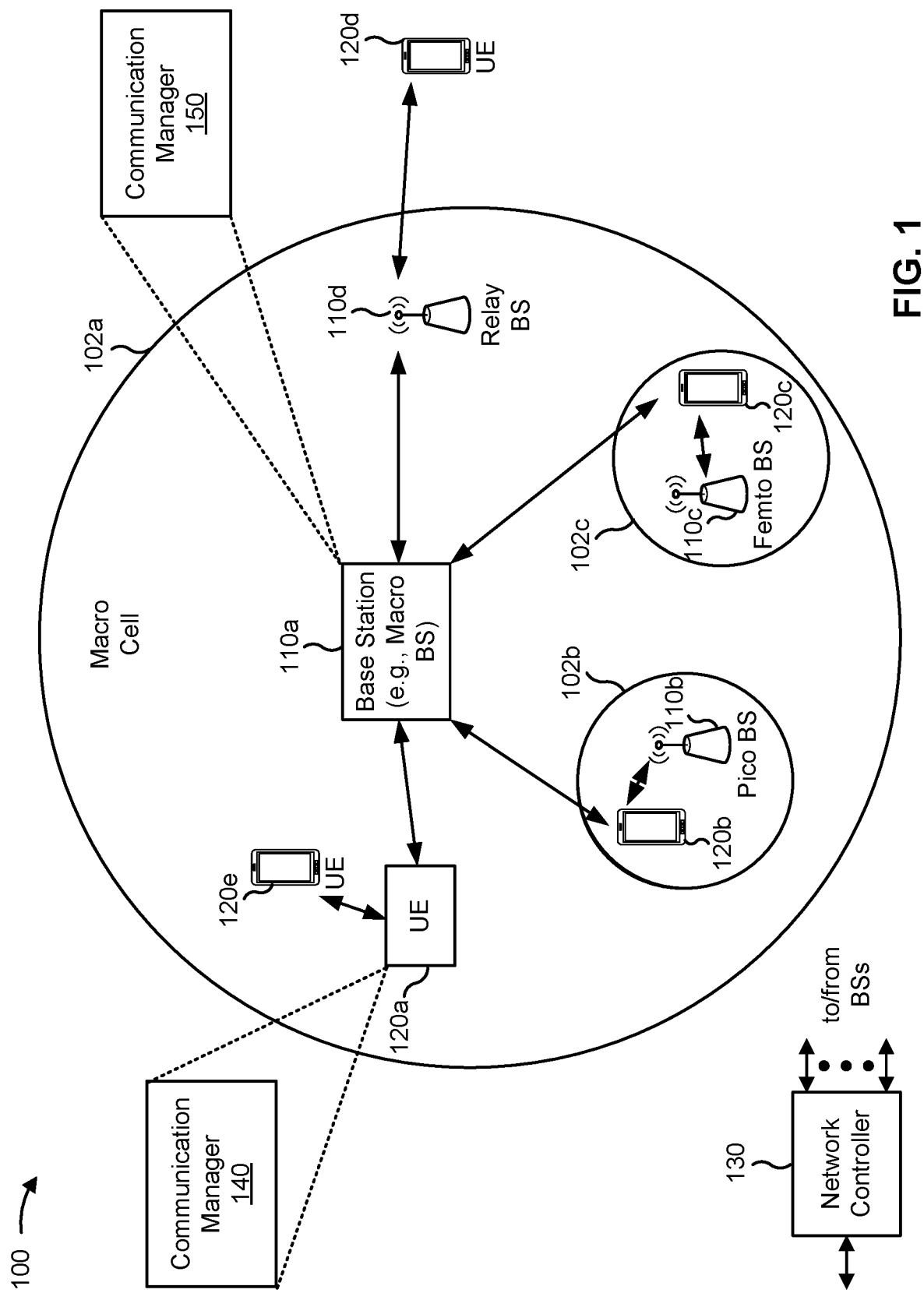
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU). "Network entity" or "network node" can refer to a disaggregated base station, or to one or more units of a disaggregated base station (such as one or more CUs, one or more DUs, one or more RUs, or a combination thereof).

Base-station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some aspects, the UE 120 may include a communication manager 140. As described in more detail elsewhere herein, the communication manager 140 may transmit a discovery message for relaying communications with a remote node, wherein the discovery message includes a link layer identifier of the relay node; transmit, to a network entity via a radio access link, information indicating the link layer identifier of the relay node; and establish a relay service using the link layer identifier. Additionally, or alternatively, the communication manager 140 may perform one or more other operations described herein.

In some aspects, a network entity such as the base station 110 or a network entity of the base station 110 may include a communication manager 150. As described in more detail elsewhere herein, the communication manager 150 may receive, from a relay node via a radio access link, information indicating a link layer identifier of the relay node associated with a relay service, wherein the relay node is associated with a radio access identifier; and configure and support a relay service with the relay node and a remote node using a mapping between the radio access identifier and the link layer identifier. Additionally, or alternatively, the communication manager 150 may perform one or more other operations described herein.

As indicated above, FIG. 1 is provided as an example. Other examples may differ from what is described with regard to FIG. 1.

Figure 2:
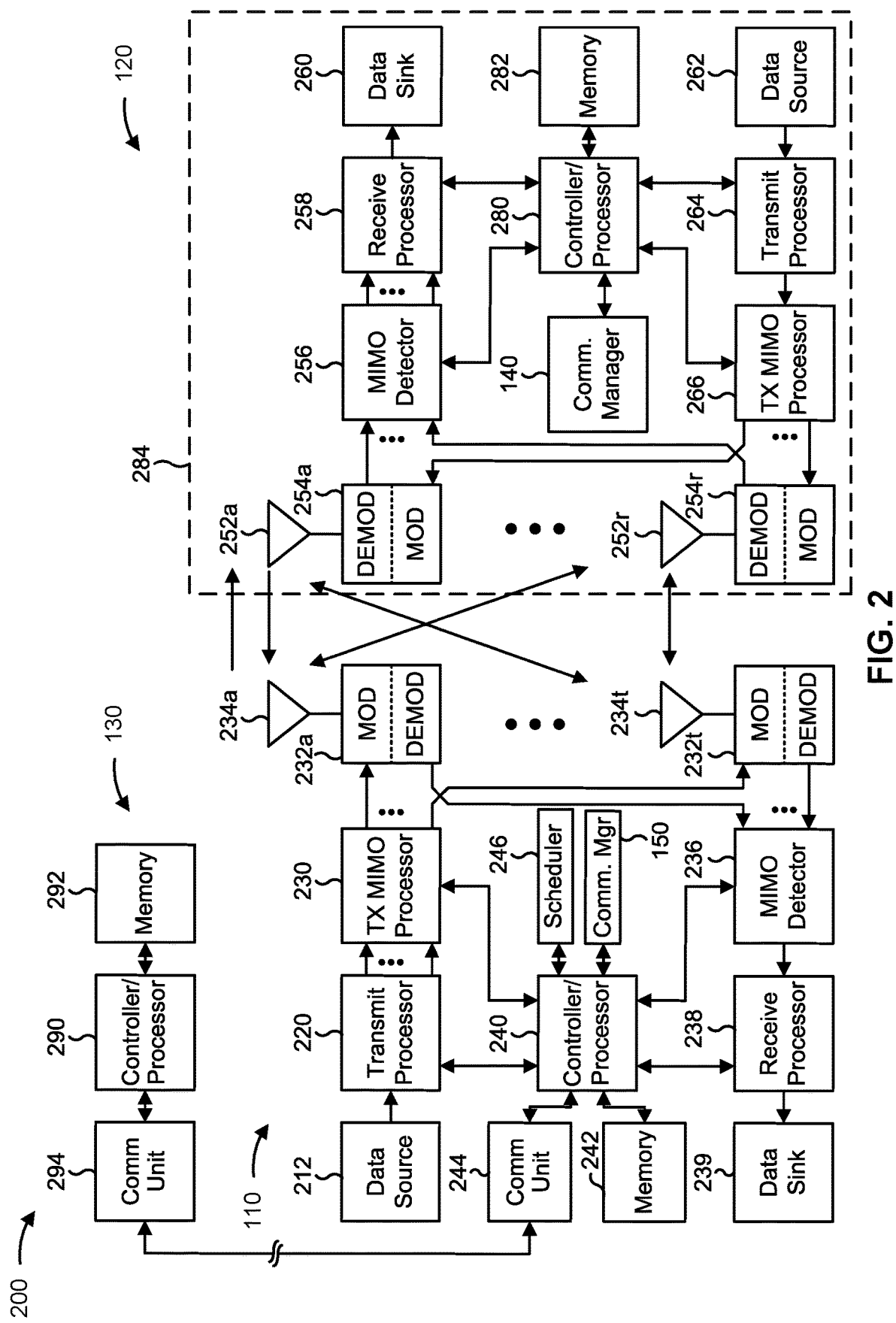
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with a relay node identifier update, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network entity (e.g., BS 110, an NG-RAN node, a CU, a DU, an RU) includes means for receiving, from a relay node via a radio access link, information indicating a link layer identifier of the relay node associated with a relay service, wherein the relay node is associated with a radio access identifier; and/or means for configuring and supporting a relay service with the relay node and a remote node using a mapping between the radio access identifier and the link layer identifier. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the relay node (e.g., UE 120, an IAB node) includes means for transmitting a discovery message for relaying communications with a remote node, wherein the discovery message includes a link layer identifier of the relay node; means for transmitting, to a network entity via a radio access link, information indicating the link layer identifier of the relay node; and/or means for establishing a relay service using the link layer identifier. In some aspects, the means for the relay node to perform operations described herein may include, for example, one or more of communication manager 150, transmit processor 220, TX MIMO processor 230, antenna 234, modem 232, MIMO detector 236, receive processor 238, controller/processor 240, memory 242, or scheduler 246. In some aspects, the means for the relay node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
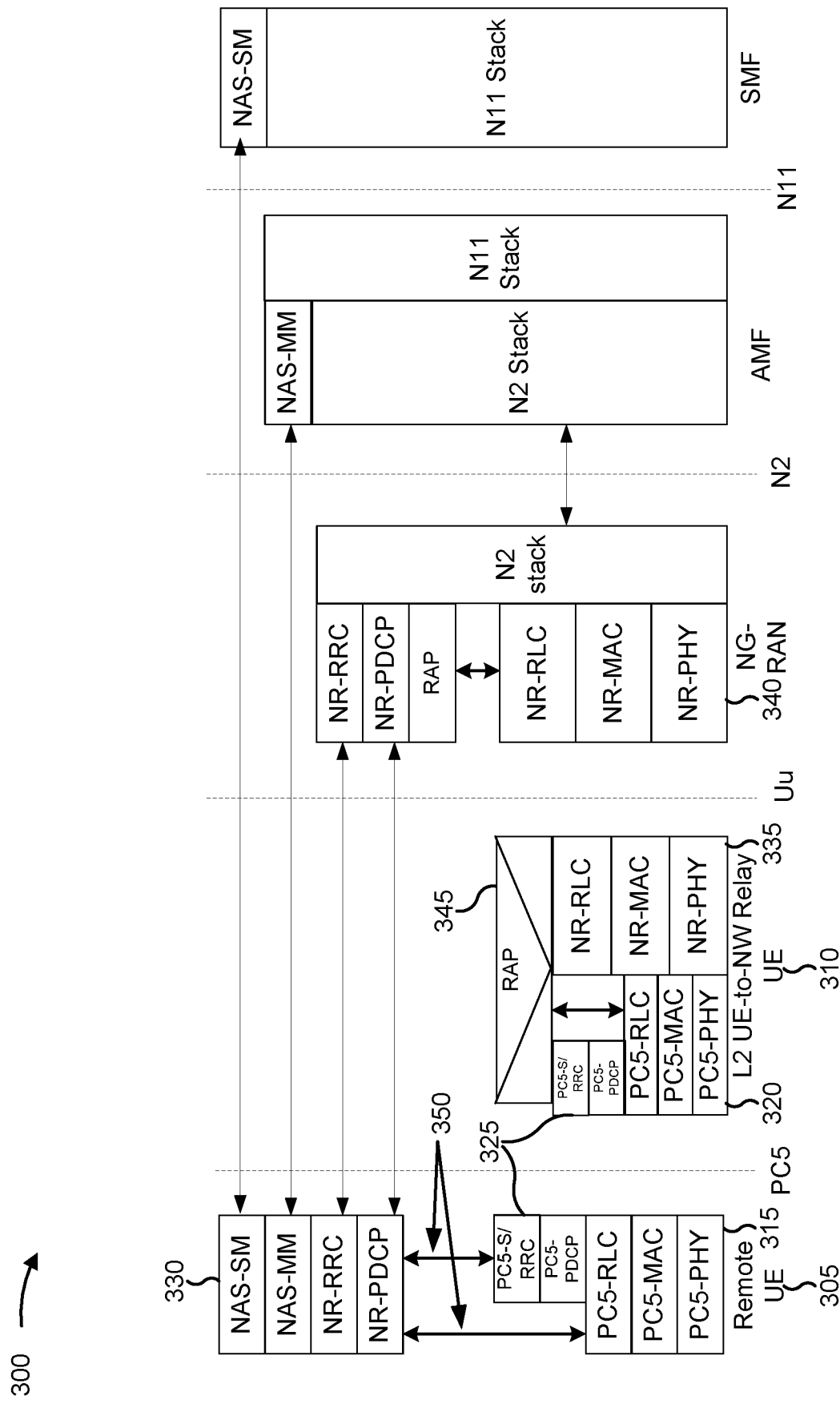
FIG. 3 is a diagram illustrating an example of a control-plane protocol architecture for a Layer 2 UE-to-network relay, in accordance with the present disclosure.
Figure 4:
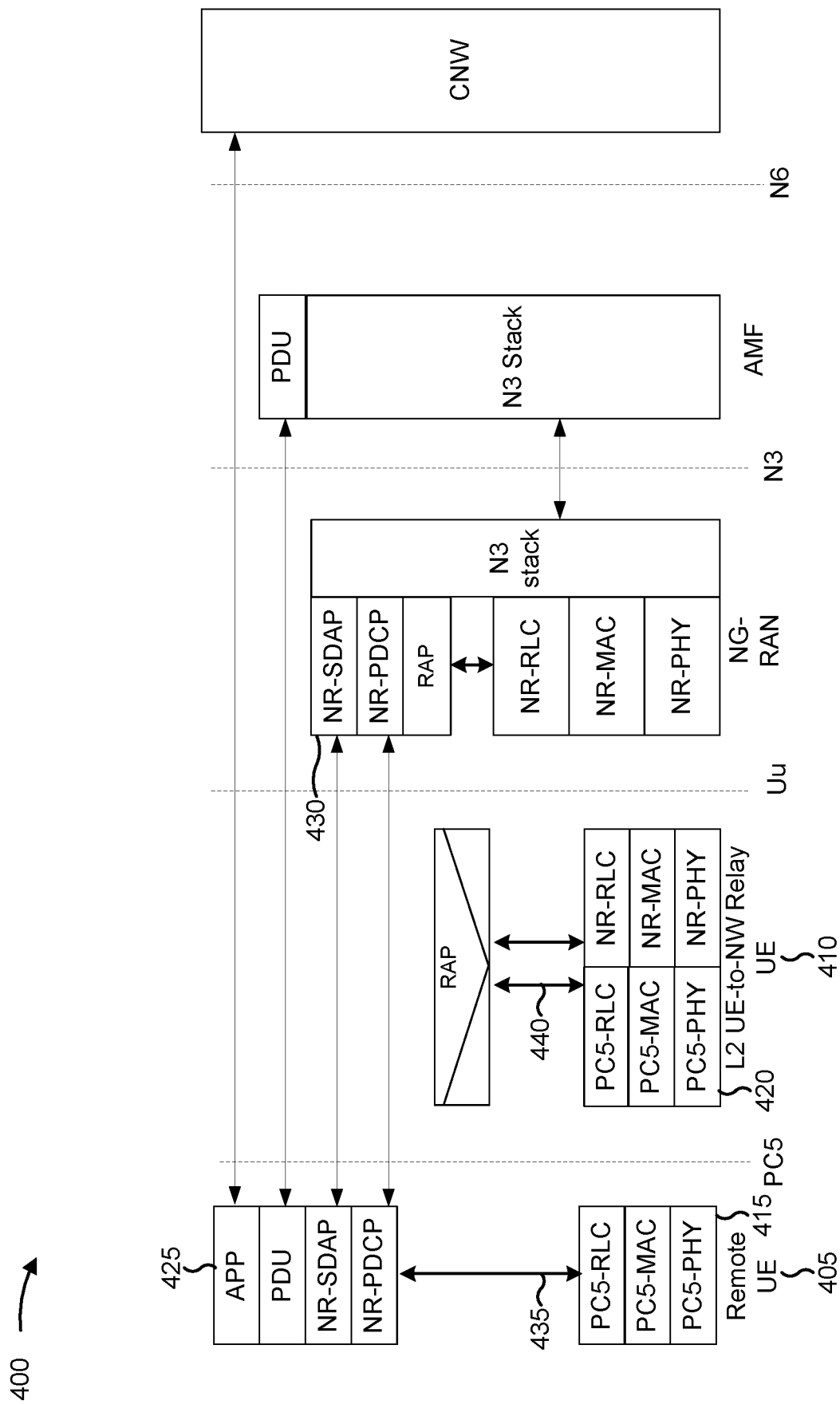
FIG. 4 is a diagram illustrating an example of a user-plane protocol architecture for a Layer 2 UE-to-network relay, in accordance with the present disclosure.

FIG. 3 is a diagram illustrating an example of a control-plane protocol architecture 300 for a Layer 2 UE-to-network relay, in accordance with the present disclosure. FIG. 4 is a diagram illustrating an example of a user-plane protocol architecture 400 for a Layer 2 UE-to-network relay, in accordance with the present disclosure. For example, the control-plane protocol architecture 300 and the user-plane protocol architecture 400 may correspond to a remote UE (e.g., UE 120) shown by reference numbers 305 and 405 and a relay UE (e.g., UE 120) shown by reference numbers 310 and 410.

FIGS. 3 and 4 illustrate examples of protocol architectures relating to sidelink communication between UEs, such as PC5 interface based communication. However, it should be understood that the techniques described herein can be applied for other forms of relay based communication, such as a relaying service via a Bluetooth (BT) connection, a WiFi connection, a device-to-device (D2D) connection, a peer-to-peer (P2P) connection, or the like.

As shown in FIG. 3, in the control-plane, there may be a PC5 interface (e.g., a sidelink interface) between the remote UE and the relay UE, a Uu interface between the relay UE and a next generation radio access network (NG-RAN), also referred to herein as a 5G access network (5G-AN), an N2 interface between the NG-RAN and an access and mobility management function (AMF) of the control-plane protocol architecture 300, and an N11 interface between the AMF and a session management function (SMF).

As shown in FIG. 4, there may be an N3 interface between the NG-RAN and a user-plane function (UPF) of the user-plane protocol architecture 400, and an N6 interface between the UPF and a core network (CNW).

As further shown, the remote UE and the relay UE may be associated with respective PC5 protocol stacks 315/320 and 415/420, enabling communication on the PC5 interface between the remote UE and the relay UE. The PC5 protocol stack may include a PC5 radio link control (RLC) component, a PC5 medium access control (MAC) component, a PC5 physical (PHY) component, and/or the like. "PC5" is generally referred to herein as "sidelink" (e.g., sidelink signaling interfaces, sidelink unicast link, sidelink RLC channels, and/or the like). Communications between the remote UE and the relay UE using the PC5 interface may be referred to as sidelink communications. The respective PC5 protocol stacks may be associated with one or more of PC5-S entities, PC5-radio resource control (RRC) entities, or PC5 packet-data convergence protocol (PDCP) entities, as shown by reference number 325. The PC5-S entity may manage a sidelink signaling interface, such as a PC5-S interface. A UE that includes a PC5-S entity and/or a PC5-RRC entity may handle control signaling and configuration of a sidelink connection with another UE, such as the connection used for relaying between the remote UE and the relay UE. In some aspects, the PC5 protocol stacks 315/320 and 415/420 may not include PC5-S entities or PC5-RRC entities. Also, in some cases, the NG-RAN may handle control signaling and configuration of the sidelink connection.

As shown by reference number 330 of FIG. 3, the remote UE is associated with a non-access stratum (NAS) stack, which includes an NAS session management (NAS-SM) component, an NAS session management (NAS-SM) component, and one or more radio access components (e.g., an NR-RRC component and an NR-PDCP component). As shown by reference number 335 of FIG. 3, the relay UE is associated with a radio access stack, including an NR-RLC component, an NR-MAC component, and an NR-PHY component. Furthermore, the NG-RAN is associated with a radio access interface stack shown by reference number 340, which includes an NR-RLC component, an NR-MAC component, an NR-PHY component, an NR-RRC entity, and an NR-PDCP entity.

The adaptation layer entity of the relay UE, shown by reference number 345, may handle relaying from the remote UE to the network or from the network to the remote UE. As used herein, "the network" may refer to any one or more of the NG-RAN, the AMF, the SMF, the UPF, or the core network (CNW). The CNW may be referred to as a 5G core (5GC). In some aspects, the adaptation layer is referred to as an adaptation layer entity. In some aspects, the adaptation layer entity may be a separate entity between a radio link control (RLC) entity and a packet data convergence entity. In some aspects, the adaptation layer entity may be logically part of the packet data convergence entity or the radio link control entity Communication between stacks of the remote UE is indicated by the lines shown by reference number 350. The line between the NR-PDCP entity and the PC5-RLC entity indicates how a message (e.g., an NR RRC message generated by the radio access protocol stack) that is not encapsulated in a sidelink signaling container, such as a PC5-S container, might be communicated from the radio access stack to the PC5 stack for transmission via the sidelink interface, or how a message that is not encapsulated in a PC5-S container might be communicated from the PC5 stack to the radio access stack after being received via the sidelink interface. Note that the line between the NR-PDCP entity and the PC5-RLC entity does not involve the PC5-S or PC5-PDCP entities, meaning that the PC5-S and PC5-PDCP entities do not handle such messages. A similar line is shown to indicate communication between the adaptation layer and the PC5-RLC entity that bypasses the PC5-S and PC5-PDCP entities of the relay UE.

The line between the NR-PDCP entity and the PC5-S or PC5-RRC entity indicates how a message (e.g., an NR RRC message generated by the radio access protocol stack) that is encapsulated in a PC5-S container might be communicated from the radio access stack to the PC5 stack for transmission via the sidelink interface, or how a message that is encapsulated in a PC5-S container might be communicated from the PC5 stack to the radio access stack after being received via the sidelink interface. Note that the line between the NR-PDCP entity and the PC5-RLC entity involves the PC5-S entity, meaning that the PC5-S entity may handle such messages.

As shown by reference number 425 of FIG. 4, the remote UE is associated with a user-plane protocol stack, which may include an application (APP) component, a protocol data unit (PDU) component, an NR service data adaptation protocol (SDAP) component, and an NR-PDCP component. Furthermore, the NG-RAN is associated with user-plane components shown by reference number 430, which include an NR-SDAP component and an NR-PDCP component. The NR-SDAP component and the NR-PDCP component may be referred to herein as radio access entities.

NR user-plane traffic (shown by a line indicated by "NR UP") may be transported between the NR-PDCP entity and the PC5-RLC component, as shown by reference number 435. Such NR user-plane traffic may be transported to the relay UE via one or more bearers, such as a data radio bearer (DRB) or signaling radio bearer (SRB). DRBs and SRBs can also be referred to as radio bearers or radio access bearers. As shown by reference number 440, the NR user-plane traffic may be provided from the PC5 stack of the relay UE to the adaptation component, and from the adaptation component to the radio access stack of the relay UE. The radio access stack of the relay UE may provide the NR user-plane traffic to the NG-RAN (not shown).

The physical layer may offer, to the MAC sublayer, transport channels. The MAC sublayer may offer, to the RLC sublayer, logical channels. The RLC sublayer may offer, to the PDCP sublayer, RLC channels. The PDCP sublayer may offer, to the SDAP sublayer, radio bearers. The SDAP sublayer may offer, to the CNW, QoS flows. The RAP layer may handle the mapping of these types of flows, channels, and bearers to each other to facilitate Layer 2 relay services, as described elsewhere herein. In some aspects, the RAP layer may be referred to as an adaptation layer, a relay adaption layer, and/or the like. A radio access bearer may include an SRB, a DRB, and/or the like. An RLC channel can also be referred to as an RLC bearer. In such a case, an RLC channel identifier associated with the RLC channel may be referred to as an RLC bearer identifier. Techniques described herein enable the selection of an identifier by the relay UE 310 for a relay service between the relay UE 310 and the remote UE 305. The identifier may be a link layer identifier. A link layer identifier is an identifier of a node that is used in a layer associated with a relay service. For example, for a Layer 2 relay service associated with a PC5 interface, the link layer identifier may be a UE identifier, such as a source Layer 2 identifier for ProSe direct discovery self-selected by the relay UE 310. For a relay service associated with a WiFi interface, a BT interface, a D2D interface, or a P2P interface, the link layer identifier may be a MAC based identifier, as described elsewhere herein. Techniques described herein also enable the relay UE 310 to signal (such as via RRC signaling by an NR-RRC entity of the relay UE 310, which is not shown in FIG. 3) the self-selected link layer identifier to the NG-RAN such that the NG-RAN can maintain a mapping of the link layer identifier to a Uu layer identifier of the relay UE 310.

As indicated above, FIGS. 3 and 4 are provided as examples. Other examples may differ from what is described with respect to FIGS. 3 and 4.

A network node referred to herein as a relay node (which may include a relay UE, an integrated access and backhaul (IAB) node, or the like) may relay communications from a remote node (which may include a UE, an IAB node, or the like) to a network or from the network to the remote UE. In some aspects, the relay node may perform Layer 2 UE-to-network relaying, in which an adaptation layer in the Layer 2 stack of the relay node performs forwarding of the remote node communications, as compared to Layer 3 relaying which may occur in the Internet Protocol (IP) layer. Communications between the relay node and the remote node, when both of these nodes are UEs, may be referred to herein as sidelink communications. Relaying can also be performed via BT, WiFi, P2P communication, or D2D communication, as some examples.

As described above, the relay node may select a link layer identifier. The link layer identifier may be used for discovery of the relay node, as well as configuration and support of a relay service between the remote node and the base station via the relay node. For example, the relay node may transmit the link layer identifier to the remote node in a discovery message. The remote node may report the link layer identifier of a selected relay node to the base station, such as in a measurement report. The base station may be aware of a radio access (e.g., Uu) identifier of the relay node, such as a cell-specific radio network temporary identifier (C-RNTI), an inactive radio network temporary identifier (I-RNTI), or the like. However, the base station may not be aware of the link layer identifier. Without the link layer identifier of the selected relay node, the base station is not capable of interpreting the measurement report, which means the base station cannot support mobility for the remote UE in the context of a relay service. Thus, configuration and support of the relay service may fail, which reduces throughput and coverage of the wireless network.

Some techniques and apparatuses described herein enable signaling of a link layer identifier from a relay node to a base station to support a relay service. For example, the relay node may signal a link layer identifier, selected by the relay node, to the base station. In some aspects, the relay node may signal information indicating a relay service associated with the link layer identifier, such as a relay service code. The relay node may also transmit the link layer identifier via a discovery message for a relay service. The base station may maintain a mapping of a link layer identifier associated with the relay node and a radio access identifier associated with the relay node. The base station may use the mapping to identify the relay node radio access connection associated with the link layer identifier reported by the remote UE. The base station may use this mapping during the remote node mobility handling to inform the remote node on the selected relay node link layer identifier and to prepare the target base station using the relay node radio access connection information corresponding to the mapped radio access identifier of the relay node. In this way, the relay node may support a relay service by notifying the base station of the relay node's self-selected link layer identifier. The base station may maintain a mapping of link layer identifiers and radio access identifiers, and may use this mapping to configure and support a relay service. Thus, mobility operations associated with relay services can be supported, which increases throughput and coverage of the wireless network.

Figure 5:
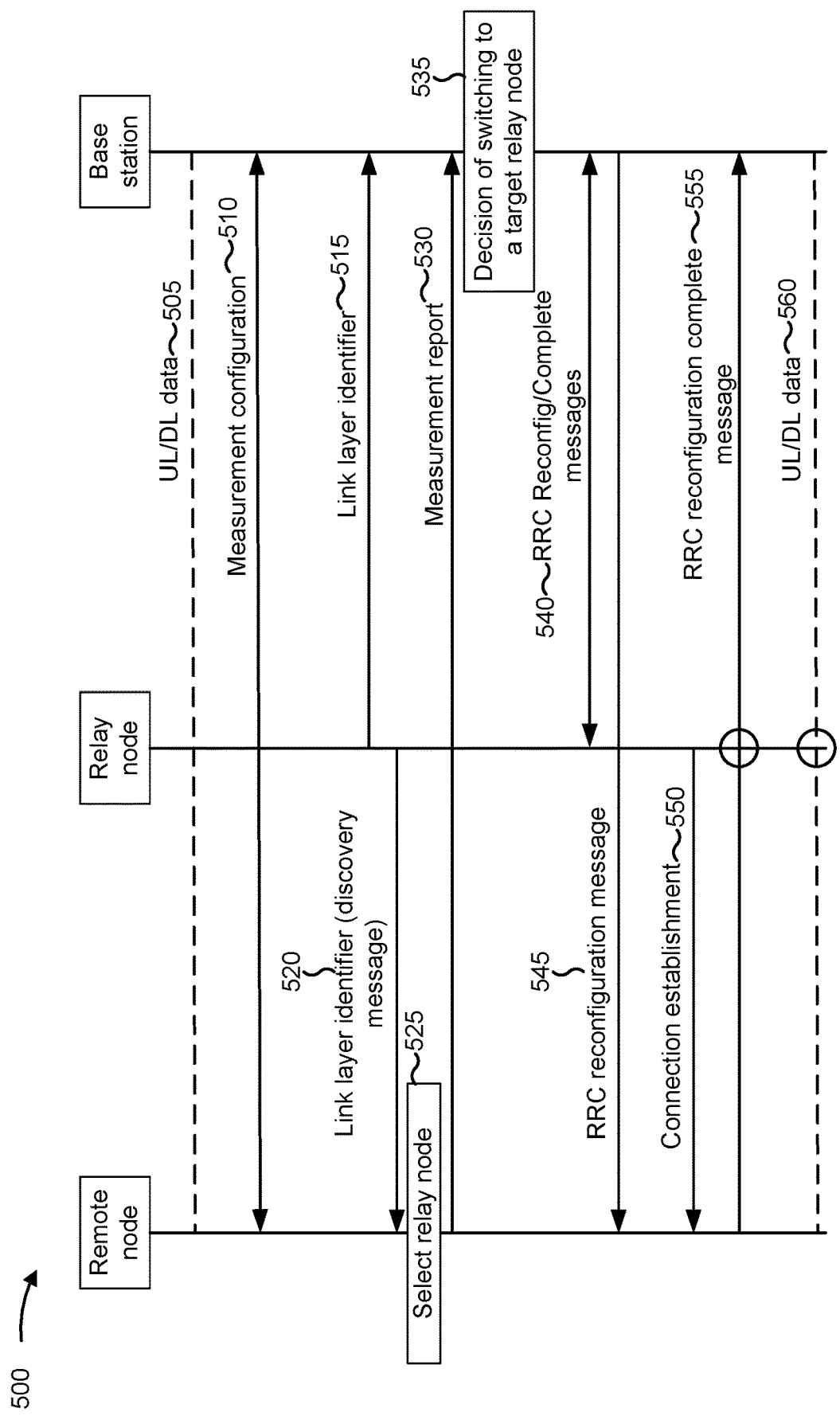
FIG. 5 is a diagram illustrating an example of signaling associated with providing a link layer identifier to support a relay service, in accordance with the present disclosure.

FIG. 5 is a diagram illustrating an example 500 of signaling associated with providing a link layer identifier to support a relay service, in accordance with the present disclosure. As shown, example 500 includes a remote node (e.g., UE 120, base station 110, an IAB node, remote UE 305), a relay node (e.g., UE 120, base station 110, an IAB node, relay UE 310), and a network entity (e.g., BS 110, an NG-RAN node).

As shown by reference number 505, the remote node and the network entity may communicate uplink and/or downlink data with each other. For example, the remote node and the network entity may have a connection, such as an RRC connection, a radio access connection (e.g., a Uu connection), or the like. The remote node and the network entity may communicate via a radio access link, such as associated with a 5G/NR RAT or another form of RAT.

As shown by reference number 510, the network entity may configure a measurement configuration for the remote node. The measurement configuration may indicate how to perform and report measurements associated with mobility, such as mobility associated with configuring a relay service with a relay node. In some aspects, the measurement configuration may indicate how to measure and report discovery messages transmitted by relay nodes. For example, the measurement configuration may relate to reporting a selected relay node based at least in part on a measurement associated with a discovery message transmitted by the selected relay node, as described below.

As shown by reference number 515, a relay node may provide a link layer identifier to the network entity. In some aspects, the relay node may provide the link layer identifier in connection with relay discovery initiation, as described in connection with FIG. 6. In some aspects, the relay node may provide the link layer identifier in connection with relay discovery updating or disabling, as described in connection with FIG. 7. In some aspects, the relay node may provide the link layer identifier via a radio access message, such as an RRC message (e.g., a SidelinkUEInformationNR message or another form of RRC message).

The link layer identifier may be selected (e.g., self-selected, generated, determined) by the relay node. In some aspects, such as when a relay service supported by the relay node uses a sidelink interface, the link layer identifier may be a source Layer 2 identifier used for discovery message transmission by the relay node. In some aspects, a relay service supported by the relay node uses a BT connection, a WiFi connection, a P2P connection, or a D2D connection. In such aspects, the link layer identifier may be at least a MAC address associated with the relay node. For example, the link layer identifier may be a MAC address, or may be a combination (e.g., a hash) of a MAC address and a relay service code associated with a relay service associated with the link layer identifier.

In some aspects, the link layer identifier may be associated with (e.g., correspond to) a relay service. For example, the link layer identifier may correspond to a relay service code or a connection (e.g., a relay connection) that the relay node supports. In some aspects, the relay node may provide multiple link layer identifiers (such as a list of link layer identifiers). For example, if the relay node supports multiple relay services, the relay node may provide a plurality of link layer identifiers, and may provide information indicating one or more relay service codes associated with the plurality of link layer identifiers. In such a case, link layer identifiers and relay service codes may be associated with each other on a one-to-one basis, a one-to-many basis, a many-to-one basis, or a many-to-many basis.

The network entity may receive the link layer identifier from the relay node. The network entity may store or generate information indicating a mapping between the link layer identifier and a radio access identifier of the relay node. For example, the mapping may indicate that the link layer identifier of the relay node is associated with a given relay service code (provided by the relay node or known to the network entity) and a radio access identifier (such as a C-RNTI or an I-RNTI). In some aspects, the network entity may associate one or more link layer identifiers and one or more radio access identifiers. For example, link layer identifiers may be mapped to radio access identifiers on a one-to-one basis, a many-to-one basis, a one-to-many basis, or a many-to-many basis.

As shown by reference number 520, the relay node may transmit a discovery message. The discovery message may indicate the link layer identifier and a relay service associated with the link layer identifier, such as a relay service code. In some aspects, the discovery message may include information associated with discovery for a relay service, such as a reference signal or a sequence that can be measured by the remote node.

As shown by reference number 525, the remote node may select the relay node for a relay service. For example, the remote node may receive the discovery message indicating the link layer identifier. The remote node may perform a measurement on the discovery message based at least in part on the measurement configuration. The remote node may determine that the relay node is a candidate relay node for establishing a connection associated with a relay service based at least in part on the measurement configuration. For example, the remote node may determine that the measurement satisfies a condition indicated by the measurement configuration, such as one or more higher layer criteria indicated by the measurement configuration.

As shown by reference number 530, the remote node may transmit a measurement report. The measurement report may indicate the relay node that was selected for the relay service. For example, the remote node may report one or more candidate relay nodes after the remote node measures and discovers the one or more candidate relay nodes. In some aspects, the remote node may filter the measurement report to identify the appropriate relay nodes meeting higher layer criteria indicated by the measurement configuration. In some aspects, the measurement report may identify the link layer identifier and measurement information associated with the link layer identifier, such as a sidelink reference signal received power (SL RSRP) (in some examples, a sidelink discovery RSRP (SD-RSRP)) or the like.

As shown by reference number 535, the network entity may determine to switch the remote node to the relay node identified by the measurement report. For example, the network entity may determine to switch the remote node to the relay node for the relay service associated with the relay node based at least in part on the measurement information. This may be considered a mobility operation for the remote node in which a connection with the relay node is configured or updated.

As shown by reference number 540, the network entity may reconfigure the relay node to support the relay service. For example, the network entity may transmit configuration information to the relay node associated with configuring the relay service (e.g., configuring a connection with the remote node for the relay service). If the relay node is connected to a different network entity, the source network entity may prepare the target network entity for relaying using the relay node radio access connection information corresponding to the relay node radio access identifier. The target network entity may transmit the configuration information to the relay node associated with configuring a connection with the remote node for the relay service. As another example, the configuration information may relate to relaying traffic between the remote node and the network entity, such as a mapping between one or more channels, bearers, or traffic flows of the remote node and one or more channels, bearers, or traffic flows of the network entity. The reconfiguration shown by reference number 540 may include a reconfiguration message transmitted from the source network entity to the relay node, which may include the target network entity reconfiguration message, and a reconfiguration complete message transmitted from the relay node to the source or target network entity.

As shown by reference number 545, the network entity may transmit configuration information to the remote node. For example, the network entity may transmit the configuration information via the radio access connection with the remote node. The configuration information may include information associated with establishing the relay service between the relay node and the remote node. For example, the configuration information may indicate the link layer identifier, a relay service code associated with the relay service, a mobility trigger indicating to establish a connection with the relay node, or the like. Thus, the network entity may configure the relay service with the relay node and the remote node (by reconfiguring the relay node, as shown by reference number 540, and the remote node, as shown by reference number 545).

The network entity may configure the relay service based at least in part on the mapping between the link layer identifier provided by the relay node as shown by reference number 520 and a radio access identifier associated with the relay node, as described elsewhere herein. For example, the network entity may configure communications between the network entity and the relay node that use the radio access identifier, to be mapped at the relay node to communications between the relay node and the remote node that use the link layer identifier. As another example, the network entity may configure an adaptation layer of the relay node such that communications associated with the radio access identifier of the relay node and the relay service code associated with the relay service are mapped to an appropriate link layer identifier for forwarding between the remote node and the network entity.

As shown by reference number 550, the remote node and the relay node may establish a connection with each other. For example, the remote node and the relay node may establish the connection if a connection does not already exist between the remote node and the relay node. In some aspects, the remote node and the relay node may establish the connection based at least in part on the configuration information shown by reference numbers 540 and 545. The connection between the remote node and the relay node may be a PC5 connection, a D2D connection, a P2P connection, a WiFi connection, a BT connection, or another form of connection between the relay node and the remote node.

As shown by reference number 555, the remote node may transmit a reconfiguration complete message to the network entity. For example, the reconfiguration complete message may be relayed via the relay node, as indicated by the circle at the relay node. The reconfiguration complete message may indicate that the connection shown by reference number 550 has been established and that data communication via the relay node can commence. Thus, the relay node and the remote node may establish a relay service. In some aspects, "establishing a relay service" may include establishing a connection associated with a relay service, as described in connection with reference number 550. In some aspects, "establishing a relay service" may include performing or relaying data communications in connection with a relay service, as shown by reference number 560. For example, the remote UE may perform data communication with the network entity via the relay node.

As indicated above, FIG. 5 is provided as an example. Other examples may differ from what is described with regard to FIG. 5.

Figure 6:
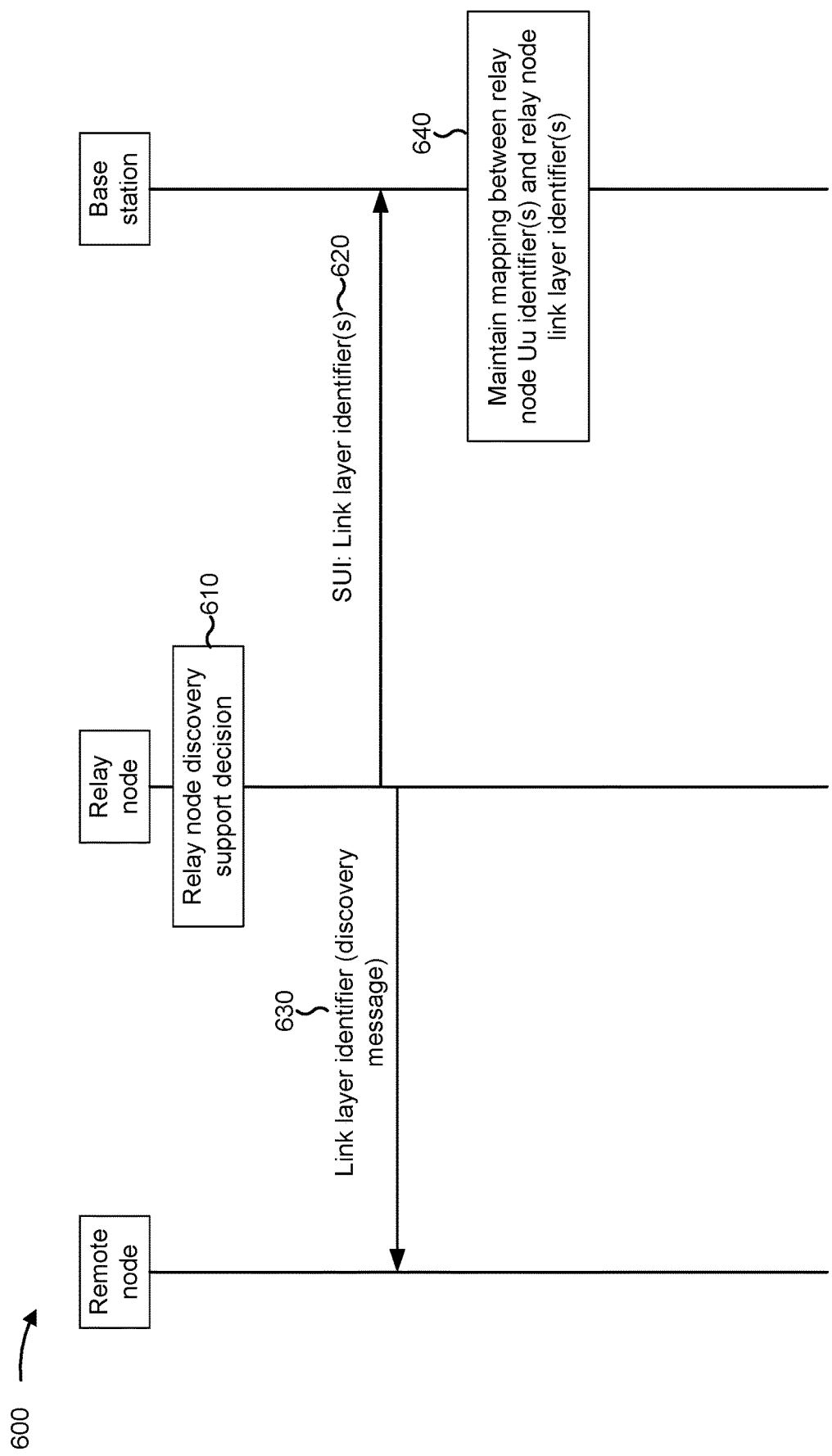
FIG. 6 is a diagram illustrating an example of signaling associated with providing a link layer identifier to support a relay service in connection with initiating discovery, in accordance with the present disclosure.

FIG. 6 is a diagram illustrating an example 600 of signaling associated with providing a link layer identifier to support a relay service in connection with initiating discovery, in accordance with the present disclosure. As shown, example 600 includes a remote node (e.g., UE 120, base station 110, an IAB node, remote UE 305), a relay node (e.g., UE 120, base station 110, an IAB node, relay UE 310), and a network entity (e.g., BS 110, an NG-RAN node).

As shown by reference number 610, the relay node may determine to support a relay service. For example, the relay node may determine to support Layer 2 relaying and, thus, to initiate discovery for the relay service. Accordingly, as shown by reference number 620, the relay node may provide via an NR RRC message (e.g. SidelinkUEInformationNR (SUI) or other RRC message) that indicates one or more link layer identifiers of the relay node. For example, the one or more link layer identifiers may be selected by the relay node. In some aspects, the message shown by reference number 620 may include information indicating one or more relay services associated with the one or more link layer identifiers, as described in connection with FIG. 5. As shown by reference number 630, the relay node may transmit a discovery message including the link layer identifier. Thus, the link layer identifier broadcasted in the discovery message has been reported to the network entity, which enables the network entity to identify the relay node associated with the link layer identifier if the remote node reports the relay node as a candidate relay node for a relaying service.

As shown by reference number 640, the network entity may maintain a mapping between one or more relay node Uu identifiers (that is, one or more radio access identifiers of the relay node) and one or more relay node link layer identifiers (that is, the one or more link layer identifiers transmitted to the network entity, as shown by reference number 620). For example, the network entity may add, to a table, information indicating a link layer identifier, a corresponding relay service code, and a corresponding radio access identifier, if such information is received (such as in connection with the relay node determining to support a relay service).

As indicated above, FIG. 6 is provided as an example. Other examples may differ from what is described with regard to FIG. 6.

Figure 7:
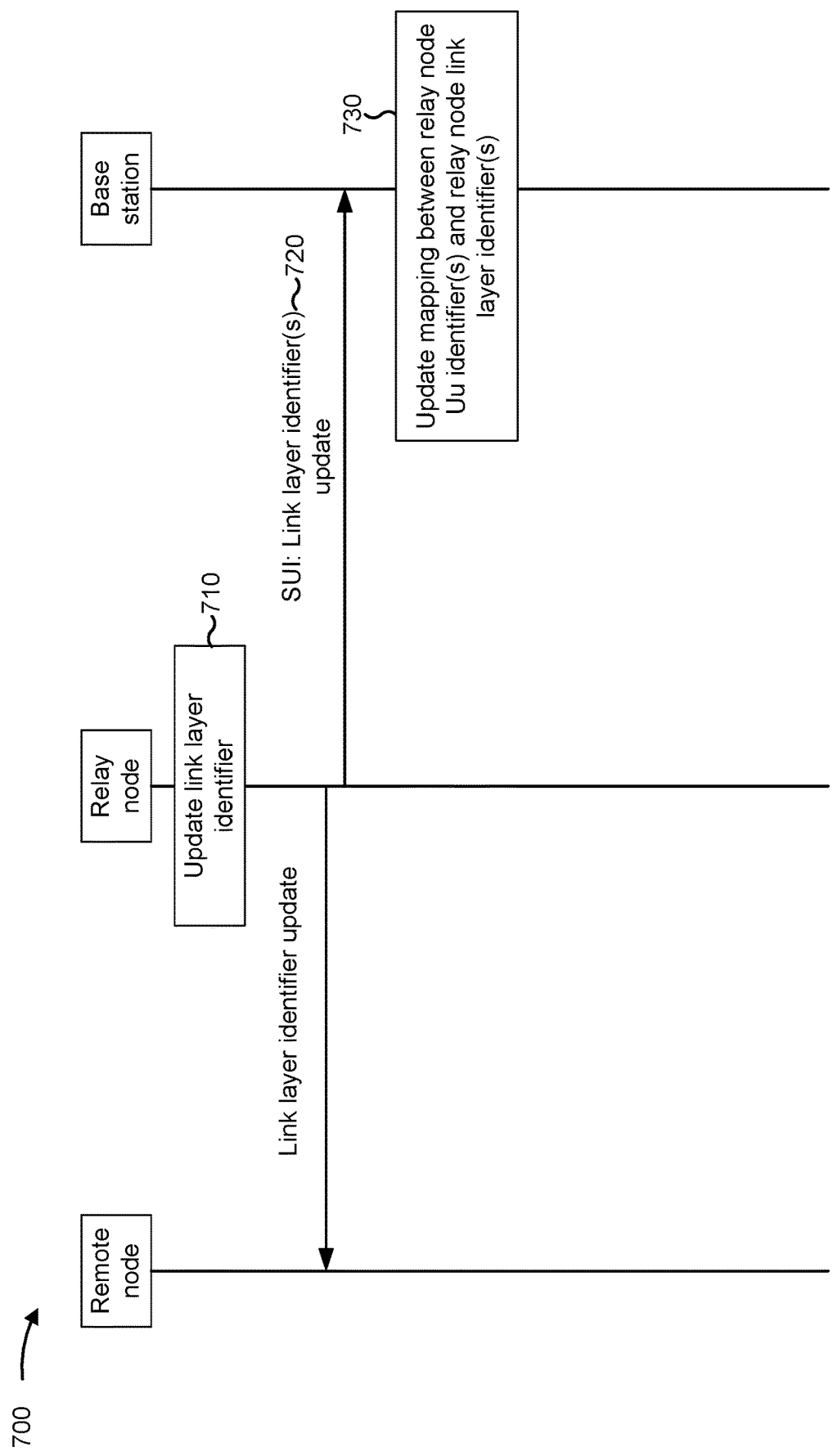
FIG. 7 is a diagram illustrating an example of signaling associated with providing a link layer identifier to support a relay service in connection with updating or disabling the relay service, in accordance with the present disclosure.

FIG. 7 is a diagram illustrating an example 700 of signaling associated with providing a link layer identifier to support a relay service in connection with updating or disabling the relay service, in accordance with the present disclosure. As shown, example 700 includes a remote node (e.g., UE 120, base station 110, an IAB node, remote UE 305), a relay node (e.g., UE 120, base station 110, an IAB node, relay UE 310), and a network entity (e.g., BS 110, an NG-RAN node).

As shown by reference number 710, the relay node may determine to update a link layer identifier associated with a relay service (referred to herein as a link layer identifier update). In some examples, the link layer identifier update can be for maintaining privacy of the service or detecting a conflict with any other UE chosen identifier. As shown by reference number 720, the relay node may provide via an NR RRC message (e.g., SidelinkUEInformationNR (SUI) or another RRC message) that indicates one or more link layer identifier updates for the relay node. For example, the message shown by reference number 720 may include information indicating an original link layer identifier and an updated link layer identifier associated with the original link layer identifier. As another example, the message shown by reference number 720 may identify an updated link layer identifier and a relay service code or a radio access identifier with which the updated link layer identifier is associated. As shown by reference number 730, the network entity may update the mapping determined in connection with reference number 640 to indicate the updated link layer identifier for the corresponding radio access identifier. Updating the mapping may be referred to herein as "updating the relay service."

In some aspects, the relay node may determine to stop supporting a relay service. In this case, the relay node may suspend discovery using the link layer update. The relay node may provide sidelink update information that indicates that the relay service should be disabled. For example, the relay node may provide an updated link layer identifier (as described in connection with reference number 720) with a value (such as a null value) indicating to disable the relay service. The network entity may disable the relay service based at least in part on the value indicating to disable the relay service. For example, the network entity may configure the remote node to establish a connection with another node (such as the network entity, another network entity, or another relay node).

As indicated above, FIG. 7 is provided as an example. Other examples may differ from what is described with regard to FIG. 7.

Figure 8:
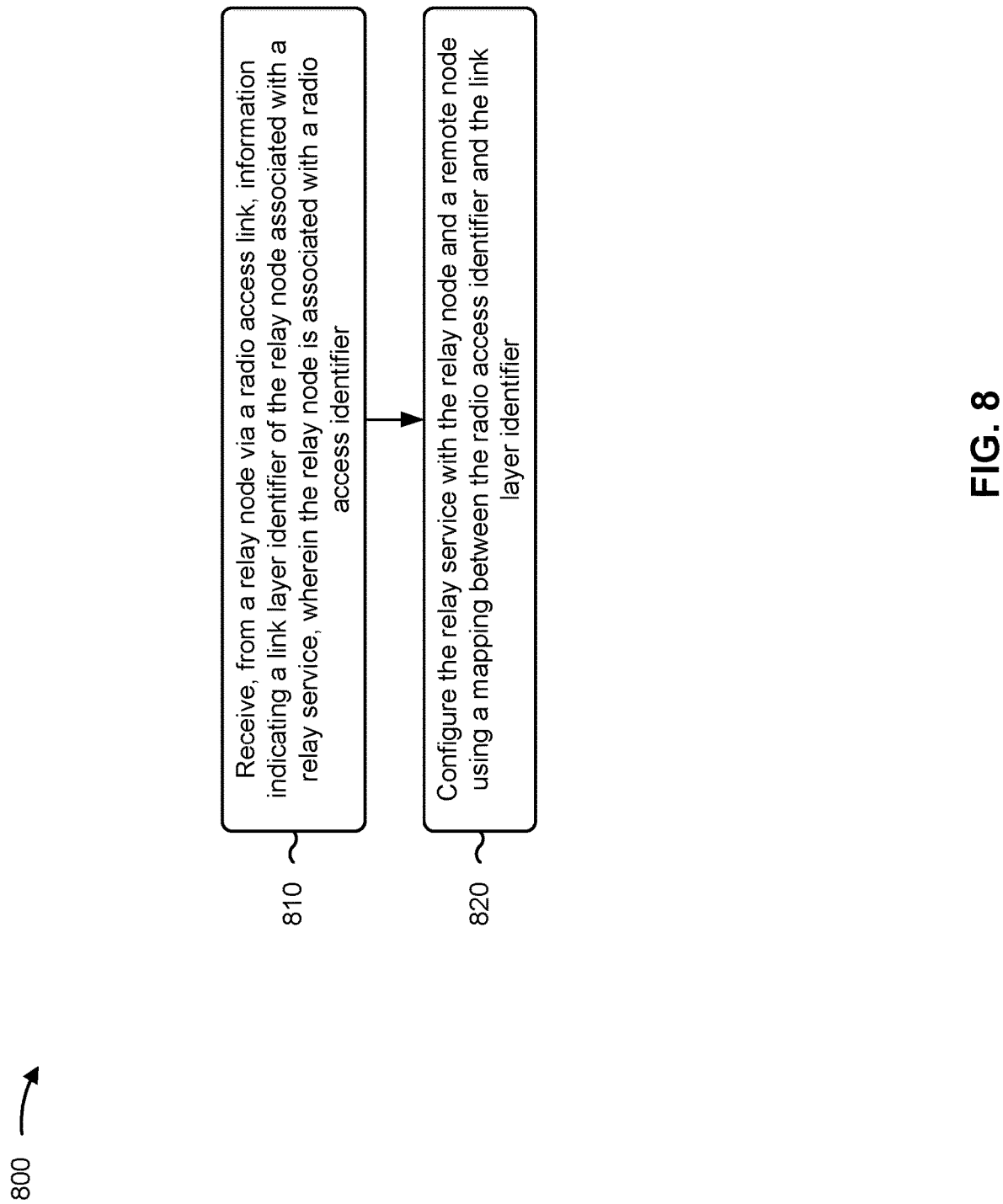
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., base station 110, an NG-RAN, a CU, a DU, an RU) performs operations associated with a relay node identifier update.

As shown in FIG. 8, in some aspects, process 800 may include receiving, from a relay node via a radio access link, information indicating a link layer identifier of the relay node associated with a relay service, wherein the relay node is associated with a radio access identifier (block 810). For example, the network entity (e.g., using communication manager 150 and/or reception component 1002, depicted in FIG. 10) may receive, from a relay node via a radio access link, information indicating a link layer identifier of the relay node associated with a relay service, wherein the relay node is associated with a radio access identifier, as described above.

As further shown in FIG. 8, in some aspects, process 800 may include configuring a relay service with the relay node and a remote node using a mapping between the radio access identifier and the link layer identifier (block 820). For example, the network entity (e.g., using communication manager 150 and/or configuration component 1008, depicted in FIG. 10) may configure a relay service with the relay node and a remote node using a mapping between the radio access identifier and the link layer identifier, as described above. In some aspects, the network entity may support the relay service. For example, the network entity may transmit or receive communications associated with relaying via the relay node using the mapping.

Process 800 may include additional aspects, such as any single aspect or any combination of aspects described below and/or in connection with one or more other processes described elsewhere herein.

In a first aspect, the information indicating the link layer identifier is received in association with initiation of discovery for the relay service.

In a second aspect, alone or in combination with the first aspect, the information indicating the link layer identifier indicates a relay service code for the link layer identifier, and configuring the relay service is based at least in part on the relay service code.

In a third aspect, alone or in combination with one or more of the first and second aspects, process 800 includes receiving a plurality of link layer identifiers associated with respective relay service codes.

In a fourth aspect, alone or in combination with one or more of the first through third aspects, the information indicating the link layer identifier is received in association with a link layer identifier update, the link layer identifier is an original link layer identifier, the information indicating the link layer identifier indicates an updated link layer identifier, and process 800 includes updating the mapping to indicate the updated link layer identifier.

In a fifth aspect, alone or in combination with one or more of the first through fourth aspects, the information indicating the link layer identifier is received in association with disabling the relay service, the link layer identifier is an original link layer identifier, the information indicating the link layer identifier indicates an updated link layer identifier with a null value, and configuring the relay service further comprises disabling the relay service based at least in part on the updated link layer identifier having the null value.

In a sixth aspect, alone or in combination with one or more of the first through fifth aspects, information indicating the link layer identifier is received via an RRC message.

In a seventh aspect, alone or in combination with one or more of the first through sixth aspects, the relay service uses a sidelink interface between the relay node and the remote node, and the link layer identifier is a source Layer 2 identifier of the relay node.

In an eighth aspect, alone or in combination with one or more of the first through seventh aspects, communication between the relay node and the remote node associated with the relay service is over one of a Bluetooth connection, a WiFi connection, a peer-to-peer (P2P) connection, or a D2D connection, and the link layer identifier is at least a medium access control address associated with the relay node.

In a ninth aspect, alone or in combination with one or more of the first through eighth aspects, communication between the relay node and the remote node associated with the relay service is over one of a Bluetooth connection, a WiFi connection, a P2P connection, or a D2D connection, and the link layer identifier is based at least in part on a combination of a medium access control address associated with the relay node and a relay service code associated with the relay service.

In a tenth aspect, alone or in combination with one or more of the first through ninth aspects, the link layer identifier is self-selected by the relay node for discovery when communicating with the remote node over one of a Bluetooth connection, a WiFi connection, a P2P connection, or a D2D connection.

In an eleventh aspect, alone or in combination with one or more of the first through tenth aspects, process 800 includes receiving, from the remote node, a report of one or more candidate relay nodes, wherein the report includes the link layer identifier, and wherein configuring and supporting the relay service is based at least in part on the report.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
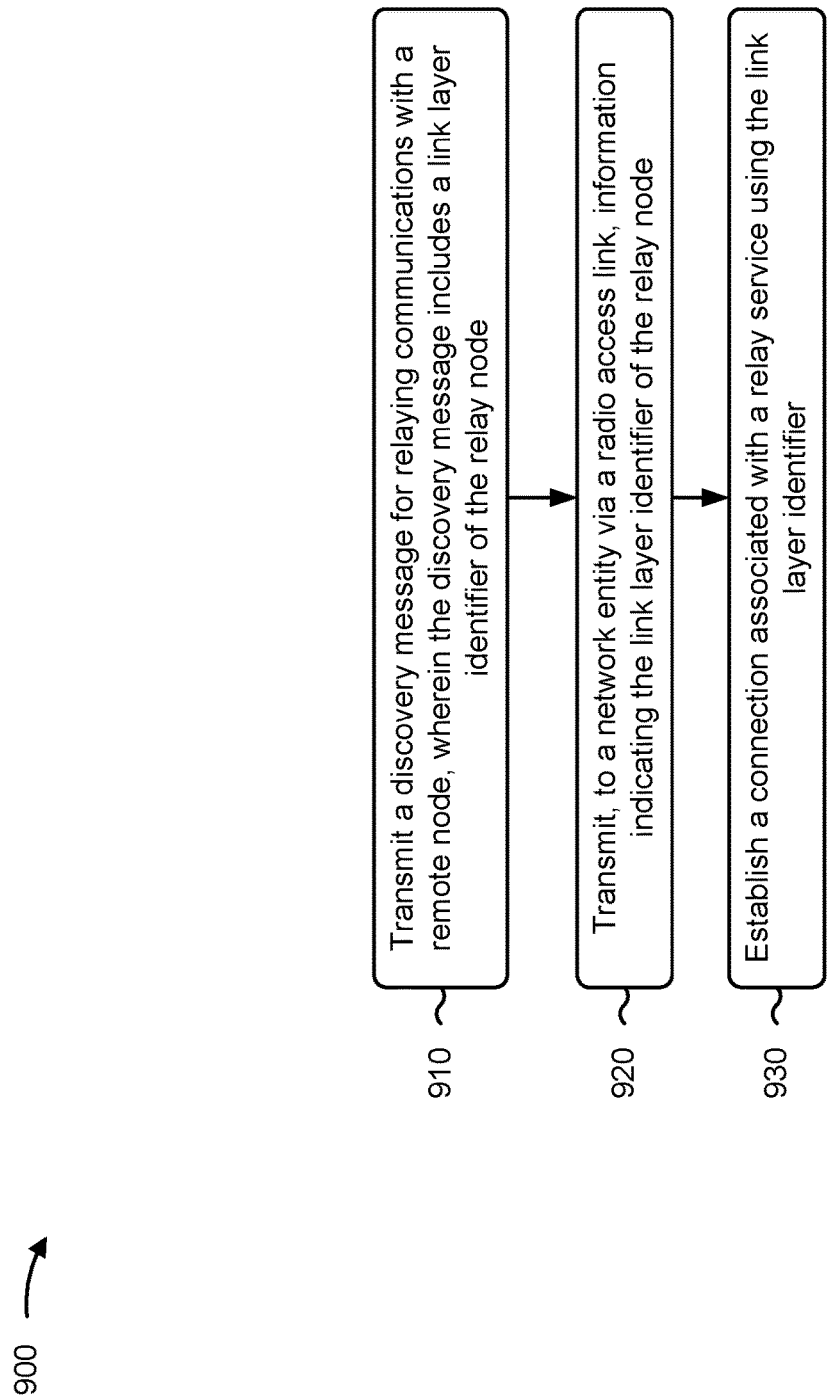
FIG. 9 is a diagram illustrating an example process performed, for example, by a relay node, in accordance with the present disclosure.

FIG. 9 is a diagram illustrating an example process 900 performed, for example, by a relay node, in accordance with the present disclosure. Example process 900 is an example where the relay node (e.g., UE 120, an IAB node) performs operations associated with a relay node identifier update.

As shown in FIG. 9, in some aspects, process 900 may include transmitting a discovery message for relaying communications with a remote node, wherein the discovery message includes a link layer identifier of the relay node (block 910). For example, the relay node (e.g., using communication manager 140 and/or transmission component 1104, depicted in FIG. 11) may transmit a discovery message for relaying communications with a remote node, wherein the discovery message includes a link layer identifier of the relay node, as described above.

As further shown in FIG. 9, in some aspects, process 900 may include transmitting, to a network entity via a radio access link, information indicating the link layer identifier of the relay node (block 920). For example, the relay node (e.g., using communication manager 140 and/or transmission component 1104, depicted in FIG. 11) may transmit, to a network entity via a radio access link, information indicating the link layer identifier of the relay node, as described above.

As further shown in FIG. 9, in some aspects, process 900 may include establishing a connection associated with a relay service using the link layer identifier (block 930). For example, the relay node (e.g., using communication manager 140 and/or establishment component 1108, depicted in FIG. 11) may establish a connection associated with a relay service using the link layer identifier, as described above. In some aspects, by establishing the connection, the relay node may establish the relay service.

Process 900 may include additional aspects, such as any single aspect or any combination of aspects described below and/or in connection with one or more other processes described elsewhere herein.

In a first aspect, the discovery message and the information indicating the link layer identifier are transmitted in association with initiation of discovery for the relay service.

In a second aspect, alone or in combination with the first aspect, the information indicating the link layer identifier indicates a relay service code for the link layer identifier.

In a third aspect, alone or in combination with one or more of the first and second aspects, process 900 includes transmitting a plurality of link layer identifiers associated with respective relay service codes if the relay node supports a plurality of relay services associated with the respective relay service codes.

In a fourth aspect, alone or in combination with one or more of the first through third aspects, the link layer identifier is an original link layer identifier, and process 900 includes transmitting, in association with a link layer identifier update, information indicating the original link layer identifier and an updated link layer identifier, and updating the relay service based at least in part on the updated link layer identifier.

In a fifth aspect, alone or in combination with one or more of the first through fourth aspects, the link layer identifier is an original link layer identifier, and process 900 includes transmitting, in association with disabling the relay service, information indicating the original link layer identifier and an updated link layer identifier with a null value, and disabling the relay service.

In a sixth aspect, alone or in combination with one or more of the first through fifth aspects, information indicating the link layer identifier is transmitted via a radio resource control (RRC) message.

In a seventh aspect, alone or in combination with one or more of the first through sixth aspects, the relay service uses a sidelink interface between the relay node and the remote node, and the link layer identifier is a source Layer 2 identifier of the relay node.

In an eighth aspect, alone or in combination with one or more of the first through seventh aspects, communication between the relay node and the remote node associated with the relay service is over one of a Bluetooth connection, a WiFi connection, a P2P connection, or a D2D connection, and the link layer identifier is at least a medium access control address associated with the relay node.

In a ninth aspect, alone or in combination with one or more of the first through eighth aspects, communication between the relay node and the remote node associated with the relay service is over one of a Bluetooth connection, a WiFi connection, a P2P connection, or a D2D connection, and the link layer identifier is based at least in part on a combination of a medium access control address associated with the relay node and a relay service code associated with the relay service.

In a tenth aspect, alone or in combination with one or more of the first through ninth aspects, process 900 includes selecting the link layer identifier for discovery when communicating with the remote node over one of a Bluetooth connection, a WiFi connection, a P2P connection, or a D2D connection.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
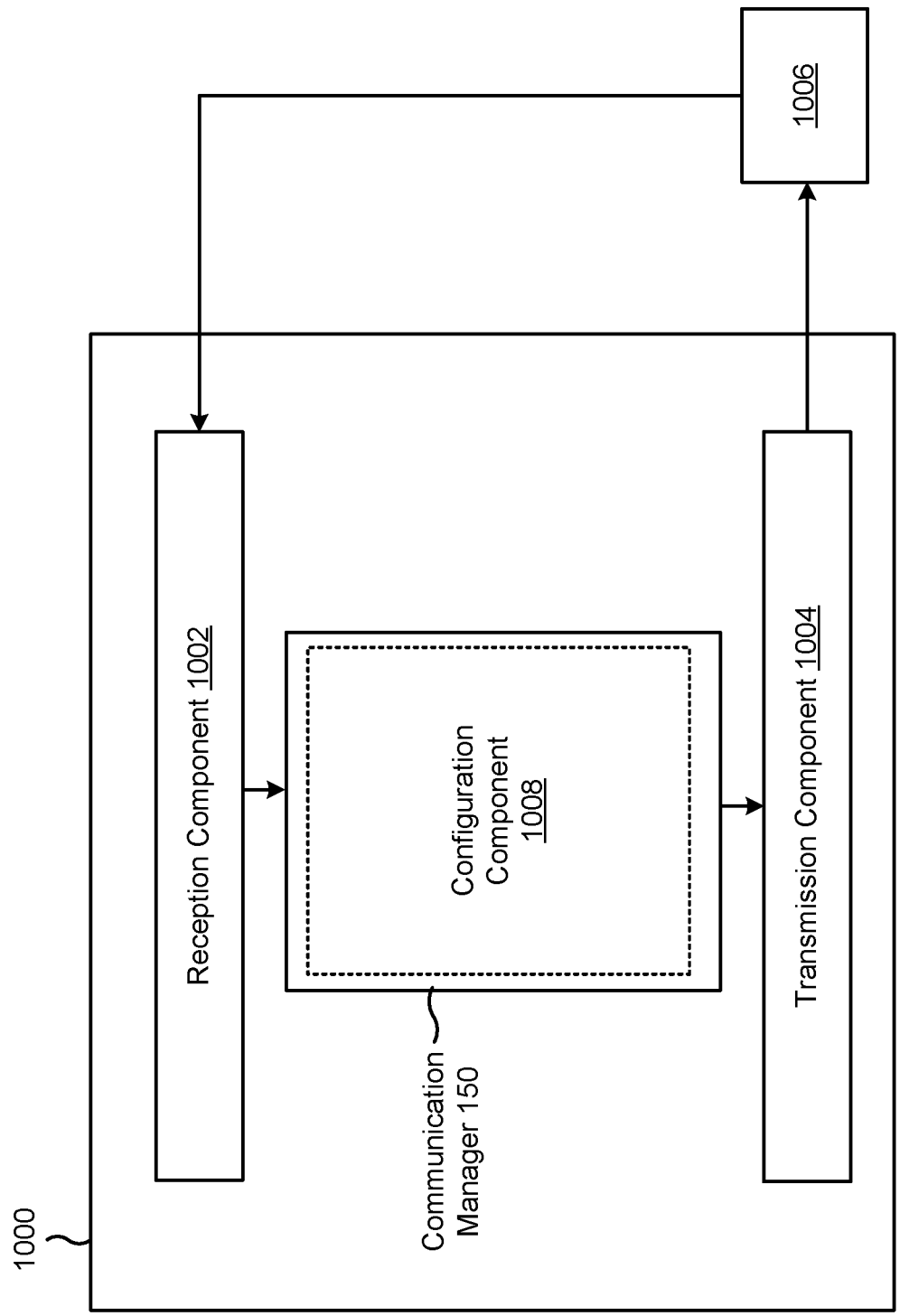
FIG. 10 is a block diagram of an example apparatus for wireless communication, in accordance with the present disclosure.

FIG. 10 is a block diagram of an example apparatus 1000 for wireless communication, in accordance with the present disclosure. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver. In some aspects, the transmission component 1004 and/or the reception component 1002 may include interfaces with a radio unit, such as a radio unit of a disaggregated base station or a remote radio head. Thus, radio functionality may be implemented separately from the apparatus 1000 (or more generally the network entity described herein).

The reception component 1002 may receive, from a relay node via a radio access link, information indicating a link layer identifier of the relay node associated with a relay service, wherein the relay node is associated with a radio access identifier. The configuration component 1008 may configure (and optionally support) a relay service with the relay node and a remote node using a mapping between the radio access identifier and the link layer identifier.

The reception component 1002 may receive a plurality of link layer identifiers associated with respective relay service codes.

The reception component 1002 may receive, from the remote node, a report of one or more candidate relay nodes, wherein the report includes the link layer identifier.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
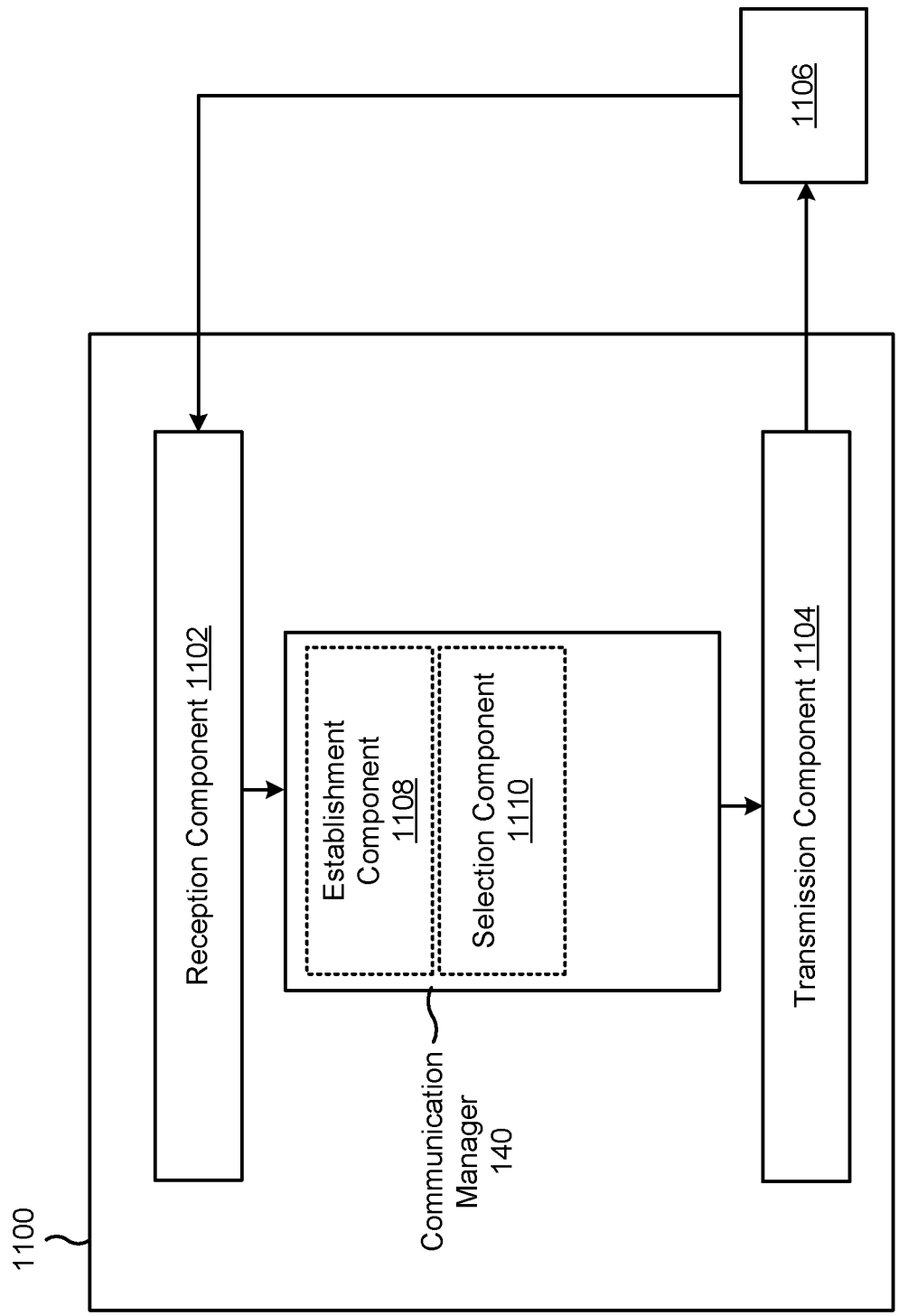
FIG. 11 is a block diagram of an example apparatus for wireless communication, in accordance with the present disclosure.

FIG. 11 is a block diagram of an example apparatus 1100 for wireless communication, in accordance with the present disclosure. The apparatus 1100 may be a relay node, or a relay node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an establishment component 1108 or a selection component 1110, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 900 of FIG. 9 or a combination thereof. In some aspects, the apparatus 1100 and/or one or more components shown in FIG. 11 may include one or more components of the relay node described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the relay node described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the relay node described above in connection with FIG. 2. In some aspects, the transmission component 1104 may be co-located with the reception component 1102 in a transceiver.

The transmission component 1104 may transmit a discovery message for relaying communications with a remote node, wherein the discovery message includes a link layer identifier of the relay node. The transmission component 1104 may transmit, to a network entity via a radio access link, information indicating the link layer identifier of the relay node. The establishment component 1108 may establish a connection associated with a relay service using the link layer identifier.

The transmission component 1104 may transmit a plurality of link layer identifiers associated with respective relay service codes if the relay node supports a plurality of relay services associated with the respective relay service codes.

The selection component 1110 may select the link layer identifier for discovery when communicating with the remote node over one of a Bluetooth connection, a WiFi connection, a P2P connection, or a D2D connection.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network entity, comprising: receiving, from a relay node via a radio access link, information indicating a link layer identifier of the relay node associated with a relay service, wherein the relay node is associated with a radio access identifier; and configuring a relay service with the relay node and a remote node using a mapping between the radio access identifier and the link layer identifier.

Aspect 2: The method of Aspect 1, wherein the information indicating the link layer identifier is received in association with initiation of discovery for the relay service.

Aspect 3: The method of any of Aspects 1-2, wherein the information indicating the link layer identifier indicates a relay service code for the link layer identifier, and wherein configuring the relay service is based at least in part on the relay service code.

Aspect 4: The method of Aspect 3, further comprising: receiving a plurality of link layer identifiers associated with respective relay service codes.

Aspect 5: The method of any of Aspects 1-4, wherein the information indicating the link layer identifier is received in association with a link layer identifier update, wherein the link layer identifier is an original link layer identifier, wherein the information indicating the link layer identifier indicates an updated link layer identifier, and wherein the method further comprises: updating the mapping to indicate the updated link layer identifier.

Aspect 6: The method of any of Aspects 1-5, wherein the information indicating the link layer identifier is received in association with disabling the relay service, wherein the link layer identifier is an original link layer identifier, wherein the information indicating the link layer identifier indicates an updated link layer identifier with a null value, and wherein configuring the relay service further comprises: disabling the relay service based at least in part on the updated link layer identifier having the null value.

Aspect 7: The method of any of Aspects 1-6, wherein information indicating the link layer identifier is received via a radio resource control (RRC) message.

Aspect 8: The method of any of Aspects 1-7, wherein the relay service uses a sidelink interface between the relay node and the remote node, and wherein the link layer identifier is a source Layer 2 identifier of the relay node.

Aspect 9: The method of any of Aspects 1-8, wherein communication between the relay node and the remote node associated with the relay service is over one of: a Bluetooth connection, a WiFi connection, a peer-to-peer (P2P) connection, or a D2D connection, and wherein the link layer identifier is at least a medium access control address associated with the relay node.

Aspect 10: The method of any of Aspects 1-9, wherein communication between the relay node and the remote node associated with the relay service is over one of: a Bluetooth connection, a WiFi connection, a peer-to-peer (P2P) connection, or a D2D connection, and wherein the link layer identifier is based at least in part on a combination of a medium access control address associated with the relay node and a relay service code associated with the relay service.

Aspect 11: The method of any of Aspects 1-10, wherein the link layer identifier is self-selected by the relay node for discovery when communicating with the remote node over one of a Bluetooth connection, a WiFi connection, a peer-to-peer (P2P) connection, or a D2D connection.

Aspect 12: The method of any of Aspects 1-11, further comprising: receiving, from the remote node, a report of one or more candidate relay nodes, wherein the report includes the link layer identifier, and wherein configuring and supporting the relay service is based at least in part on the report.

Aspect 13: A method of wireless communication performed by a relay node, comprising: transmitting a discovery message for relaying communications with a remote node, wherein the discovery message includes a link layer identifier of the relay node; transmitting, to a network entity via a radio access link, information indicating the link layer identifier of the relay node; and establishing a connection associated with a relay service using the link layer identifier.

Aspect 14: The method of Aspect 13, wherein the discovery message and the information indicating the link layer identifier are transmitted in association with initiation of discovery for the relay service.

Aspect 15: The method of any of Aspects 13-14, wherein the information indicating the link layer identifier indicates a relay service code for the link layer identifier.

Aspect 16: The method of any of Aspects 13-15, further comprising: transmitting a plurality of link layer identifiers associated with respective relay service codes if the relay node supports a plurality of relay services associated with the respective relay service codes.

Aspect 17: The method of any of Aspects 13-16, wherein the link layer identifier is an original link layer identifier, and wherein the method further comprises: transmitting, in association with a link layer identifier update, information indicating the original link layer identifier and an updated link layer identifier, and wherein the method further comprises: updating the relay service based at least in part on the updated link layer identifier.

Aspect 18: The method of any of Aspects 13-17, wherein the link layer identifier is an original link layer identifier, and wherein the method further comprises: transmitting, in association with disabling the relay service, information indicating the original link layer identifier and an updated link layer identifier with a null value; and disabling the relay service.

Aspect 19: The method of any of Aspects 13-18, wherein information indicating the link layer identifier is transmitted via a radio resource control (RRC) message.

Aspect 20: The method of any of Aspects 13-19, wherein the relay service uses a sidelink interface between the relay node and the remote node, and wherein the link layer identifier is a source Layer 2 identifier of the relay node.

Aspect 21: The method of any of Aspects 13-20, wherein communication between the relay node and the remote node associated with the relay service is over one of: a Bluetooth connection, a WiFi connection, a peer-to-peer (P2P) connection, or a D2D connection, and wherein the link layer identifier is at least a medium access control address associated with the relay node.

Aspect 22: The method of any of Aspects 13-21, wherein communication between the relay node and the remote node associated with the relay service is over one of: a Bluetooth connection, a WiFi connection, a peer-to-peer (P2P) connection, or a D2D connection, and wherein the link layer identifier is based at least in part on a combination of a medium access control address associated with the relay node and a relay service code associated with the relay service.

Aspect 23: The method of any of Aspects 13-22, further comprising: selecting the link layer identifier for discovery when communicating with the remote node over one of a Bluetooth connection, a WiFi connection, a peer-to-peer (P2P) connection, or a D2D connection.

Aspect 23: A method of wireless communication performed by a network entity, comprising: receiving, from a relay node via a radio access link, information indicating a link layer identifier of the relay node associated with a relay service, wherein the relay node is associated with a radio access identifier; and configuring the relay service with the relay node and a remote node.

Aspect 24: The method of Aspect 23, wherein the information indicating the link layer identifier indicates a relay service code for the link layer identifier, and wherein configuring the relay service is based at least in part on the relay service code.

Aspect 25: The method of Aspect 24, further comprising: receiving a plurality of link layer identifiers associated with respective relay service codes.

Aspect 26: The method of Aspect 23, wherein configuring the relay service with the relay node and a remote node comprises configuring the relay service using a mapping between the radio access identifier and the link layer identifier.

Aspect 27: The method of Aspect 26, wherein the information indicating the link layer identifier is received in association with a link layer identifier update, wherein the link layer identifier is an original link layer identifier, wherein the information indicating the link layer identifier indicates an updated link layer identifier, and wherein the method further comprises: updating the mapping to indicate the updated link layer identifier.

Aspect 28: The method of any of Aspects 23-27, wherein the information indicating the link layer identifier is received in association with discovery for the relay service.

Aspect 29: The method of any of Aspects 23-28, wherein the information indicating the link layer identifier is received in association with disabling the relay service, wherein the link layer identifier is an original link layer identifier, wherein the information indicating the link layer identifier indicates an updated link layer identifier with a null value, and wherein configuring the relay service further comprises: disabling the relay service based at least in part on the updated link layer identifier having the null value.

Aspect 30: The method of any of Aspects 23-29, wherein information indicating the link layer identifier is received via a radio resource control (RRC) message.

Aspect 31: The method of any of Aspects 23-30, wherein the relay service uses a sidelink interface between the relay node and the remote node, and wherein the link layer identifier is a source Layer 2 identifier for discovery message transmission by the relay node.

Aspect 32: The method of any of Aspects 23-31, wherein communication between the relay node and the remote node associated with the relay service is over one of: a Bluetooth connection, a WiFi connection, a peer-to-peer (P2P) connection, or a D2D connection, and wherein the link layer identifier comprises at least a medium access control address associated with the relay node.

Aspect 33: The method of any of Aspects 23-32, wherein communication between the relay node and the remote node associated with the relay service is over one of: a Bluetooth connection, a WiFi connection, a peer-to-peer (P2P) connection, or a D2D connection, and wherein the link layer identifier is based at least in part on a combination of a medium access control address associated with the relay node and a relay service code associated with the relay service.

Aspect 34: The method of any of 23-33, wherein the link layer identifier is self-selected by the relay node for discovery when communicating with the remote node over one of a Bluetooth connection, a WiFi connection, a peer-to-peer (P2P) connection, or a D2D connection.

Aspect 35: The method of any of Aspects 23-34, further comprising: receiving, from the remote node, a report of one or more candidate relay nodes, wherein the report includes the link layer identifier, and wherein configuring and supporting the relay service is based at least in part on the report.

Aspect 36: A method of wireless communication performed by a relay node, comprising: transmitting a discovery message for relaying communications with a remote node, wherein the discovery message includes a link layer identifier of the relay node; and transmitting, via a radio access link, information indicating the link layer identifier of the relay node.

Aspect 37: The method of Aspect 36, further comprising establishing a connection associated with a relay service using the link layer identifier.

Aspect 38: The method of any of Aspects 36-37, wherein the discovery message and the information indicating the link layer identifier are transmitted in association with discovery for a relay service.

Aspect 39: The method of any of Aspects 36-38, further comprising: transmitting a plurality of link layer identifiers associated with respective relay service codes.

Aspect 40: The method of any of Aspects 36-39, further comprising: selecting the link layer identifier for discovery when communicating with the remote node over one of a Bluetooth connection, a WiFi connection, a peer-to-peer (P2P) connection, or a D2D connection.

Aspect 41: The method of any of Aspects 36-40, wherein the relay service uses a sidelink interface between the relay node and the remote node, and wherein the link layer identifier is a source Layer 2 identifier for discovery message transmission by the relay node.

Aspect 42: An apparatus for wireless communication at a device, comprising a processor; memory coupled with the processor; and instructions stored in the memory and executable by the processor to cause the apparatus to perform the method of one or more of Aspects 1-41.

Aspect 43: A device for wireless communication, comprising a memory and one or more processors coupled to the memory, the one or more processors configured to perform the method of one or more of Aspects 1-41.

Aspect 44: An apparatus for wireless communication, comprising at least one means for performing the method of one or more of Aspects 1-41.

Aspect 45: A non-transitory computer-readable medium storing code for wireless communication, the code comprising instructions executable by a processor to perform the method of one or more of Aspects 1-41.

Aspect 46: A non-transitory computer-readable medium storing a set of instructions for wireless communication, the set of instructions comprising one or more instructions that, when executed by one or more processors of a device, cause the device to perform the method of one or more of Aspects 1-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a relay node for wireless communication, comprising:
   one or more memories; and
   one or more processors, coupled to the one or more memories, configured to:
   transmit a discovery message for relaying communications with a remote node, wherein the discovery message includes a link layer identifier of the relay node; and
   transmit, to a base station via a radio access Uu link between the relay node and a radio access network, information indicating the link layer identifier of the relay node.

2. The apparatus of claim 1, wherein the one or more processors are further configured to establish a connection associated with a relay service using the link layer identifier.

3. The apparatus of claim 1, wherein the discovery message and the information indicating the link layer identifier are transmitted in association with discovery for a relay service.

4. The apparatus of claim 1, wherein the one or more processors are further configured to:
   transmit a plurality of link layer identifiers associated with respective relay service codes.

5. The apparatus of claim 1, wherein the one or more processors are further configured to:
   select the link layer identifier for discovery when communicating with the remote node over one of a Bluetooth connection, a WiFi connection, a peer-to-peer (P2P) connection, or a D2D connection.

6. The apparatus of claim 1, wherein a relay service uses a sidelink interface between the relay node and the remote node, and wherein the link layer identifier is a source Layer 2 identifier for discovery message transmission by the relay node.

7. A method of wireless communication performed by a relay node, comprising:
   transmitting a discovery message for relaying communications with a remote node, wherein the discovery message includes a link layer identifier of the relay node;
   transmitting, to a base station via a Uu radio access link between the relay node and a radio access network, information indicating the link layer identifier of the relay node; and
   establishing a connection associated with a relay service using the link layer identifier.

8. The method of claim 7, wherein the discovery message and the information indicating the link layer identifier are transmitted in association with discovery for the relay service.

9. The method of claim 7, wherein the information indicating the link layer identifier indicates a relay service code for the link layer identifier.

10. The method of claim 7, further comprising:
    transmitting a plurality of link layer identifiers associated with respective relay service codes if the relay node supports a plurality of relay services associated with the respective relay service codes.

11. The method of claim 7, wherein the link layer identifier is an original link layer identifier, and wherein the method further comprises:
    transmitting, in association with a link layer identifier update, information indicating the original link layer identifier and an updated link layer identifier, and wherein the method further comprises:
    updating the relay service based at least in part on the updated link layer identifier.

12. The method of claim 7, further comprising:
    selecting the link layer identifier for discovery when communicating with the remote node over one of a Bluetooth connection, a WiFi connection, a peer-to-peer (P2P) connection, or a D2D connection.

13. The apparatus of claim 2, wherein the relay service is configured using a mapping between the link layer identifier and a radio access identifier associated with the relay node.

14. The apparatus of claim 13, wherein:
    the information indicating the link layer identifier is transmitted in association with a link layer identifier update,
    the link layer identifier is an original link layer identifier,
    the information indicating the link layer identifier indicates an updated link layer identifier, and
    the mapping is updated to indicate the updated link layer identifier.

15. The apparatus of claim 2, wherein:
    the information indicating the link layer identifier is transmitted in association with disabling the relay service,
    the link layer identifier is an original link layer identifier,
    the information indicating the link layer identifier indicates an updated link layer identifier with a null value, and
    the relay service is disabled based at least in part on the updated link layer identifier having the null value.

16. The apparatus of claim 2, wherein communication between the relay node and the remote node associated with the relay service is over one of:
- a Bluetooth connection,
- a WiFi connection,
- a peer-to-peer (P2P) connection, or
- a D2D connection.

17. The apparatus of claim 16, wherein the link layer identifier comprises at least a medium access control address associated with the relay node.

18. The apparatus of claim 16, wherein the link layer identifier is based at least in part on a combination of a medium access control address associated with the relay node and a relay service code associated with the relay service.

19. The apparatus of claim 2, wherein the information indicating the link layer identifier indicates a relay service code for the link layer identifier, and wherein the relay service is based at least in part on the relay service code.

20. The apparatus of claim 1, wherein the information indicating the link layer identifier is transmitted via a radio resource control (RRC) message.

21. The method of claim 7, wherein the relay service is configured using a mapping between the link layer identifier and a radio access identifier associated with the relay node.

22. The method of claim 7, wherein:
- the information indicating the link layer identifier is transmitted in association with disabling the relay service,
- the link layer identifier is an original link layer identifier,
- the information indicating the link layer identifier indicates an updated link layer identifier with a null value, and
- the relay service is disabled based at least in part on the updated link layer identifier having the null value.

23. The method of claim 7, wherein communication between the relay node and the remote node associated with the relay service is over one of:
- a Bluetooth connection,
- a WiFi connection,
- a peer-to-peer (P2P) connection, or
- a D2D connection.

24. The method of claim 23, wherein the link layer identifier comprises at least a medium access control address associated with the relay node.

25. The method of claim 23, wherein the link layer identifier is based at least in part on a combination of a medium access control address associated with the relay node and a relay service code associated with the relay service.

26. The method of claim 7, wherein the relay service uses a sidelink interface between the relay node and the remote node, and wherein the link layer identifier is a source Layer 2 identifier for discovery message transmission by the relay node.

27. The method of claim 7, wherein the information indicating the link layer identifier is transmitted via a radio resource control (RRC) message.

28. A non-transitory computer-readable medium of a relay node storing a set of instructions for wireless communication, the set of instructions comprising:
- one or more instructions that, when executed by one or more processors of a wireless device, cause the wireless device to:
  - transmit a discovery message for relaying communications with a remote node, wherein the discovery message includes a link layer identifier of the relay node; and
  - transmit, to a base station and via a radio access Uu link between the relay node and a radio access network, information indicating the link layer identifier of the relay node.

29. An apparatus of a relay node for wireless communication, comprising:
- means for transmitting a discovery message for relaying communications with a remote node, wherein the discovery message includes a link layer identifier of the relay node; and
- means for transmitting, to a base station and via a radio access Uu link between the relay node and a radio access network, information indicating the link layer identifier of the relay node.

30. The non-transitory computer-readable medium of claim 28, wherein the one or more instructions, when executed by the one or more processors, further cause the wireless device to:
- transmit a plurality of link layer identifiers associated with respective relay service codes.

* * * * *